United States Patent [19]

Lebensfeld et al.

[11] Patent Number: 5,597,593

[45] Date of Patent: Jan. 28, 1997

[54] TOY MOLD SYSTEM WITH UNDERCUTS

[76] Inventors: Steven Lebensfeld, 5 Cove La., Kings Point, N.Y. 11024; Lawrence Blaustein, 11310 Juniper Rd., Cleveland, Ohio 44106

[21] Appl. No.: 386,488

[22] Filed: Feb. 10, 1995

[51] Int. Cl.⁶ .............................. B29C 33/44; B29C 39/34
[52] U.S. Cl. ...................... 425/410; 249/105; 249/168; 249/170; 264/318; 425/442; 425/DIG. 57; 425/DIG. 58
[58] Field of Search ................... 264/318, 328.1, 264/328.7; 425/DIG. 57, DIG. 58, 441, 442, 330, 542; 249/105, 168, 170, 140; 206/223, 568, 575

[56] References Cited

U.S. PATENT DOCUMENTS

| | | | |
|---|---|---|---|
| 1,287,599 | 12/1918 | Leland et al. | 425/DIG. 57 |
| 1,825,967 | 10/1931 | Ganger | 249/140 |
| 1,886,486 | 11/1932 | Ganger | 249/140 |
| 2,194,289 | 3/1940 | Barnes | 249/140 |
| 2,309,579 | 1/1943 | Duran | 425/DIG. 57 |
| 2,351,885 | 6/1944 | Sommerfeld | 425/DIG. 57 |
| 2,668,999 | 2/1954 | Baechler | 249/140 |
| 2,819,510 | 1/1958 | Vom Norden | 249/168 |
| 2,954,597 | 10/1960 | McFarland | 425/408 |
| 2,964,791 | 12/1960 | McFarland | 425/183 |
| 3,179,980 | 4/1965 | Ryan et al. | 425/DIG. 57 |
| 3,222,723 | 12/1965 | Boggild et al. | 425/410 |
| 3,332,658 | 7/1967 | Lemelson | 249/139 |
| 3,741,706 | 6/1973 | Conley et al. | 425/406 |
| 3,859,020 | 1/1975 | Rentz | 425/130 |
| 3,861,640 | 1/1975 | Agneta | 425/DIG. 57 |
| 3,891,179 | 6/1975 | Berman | 249/134 |
| 3,921,801 | 11/1975 | Sway | 206/575 |
| 3,986,809 | 10/1976 | Haag | 425/DIG. 57 |
| 3,987,144 | 10/1976 | Nickold | 264/318 |
| 4,215,843 | 8/1980 | Gay et al. | 425/DIG. 57 |
| 4,253,637 | 3/1981 | Rosbach | 249/168 |
| 4,299,548 | 11/1981 | Saffer et al. | 425/DIG. 57 |
| 4,717,113 | 1/1988 | Martin | 425/441 |
| 4,828,116 | 5/1989 | Garcia | 206/575 |
| 4,894,000 | 1/1990 | Coates, Jr. | 425/DIG. 57 |
| 4,975,041 | 12/1990 | Fries et al. | 425/441 |
| 5,088,598 | 2/1992 | Iguchi | 425/DIG. 57 |

FOREIGN PATENT DOCUMENTS

| | | | |
|---|---|---|---|
| 1906275 | 9/1970 | Germany | 425/DIG. 57 |
| 2353646 | 4/1975 | Germany | 425/DIG. 58 |
| 170693 | 11/1921 | United Kingdom | 249/168 |

OTHER PUBLICATIONS

Johnny Toymaker Instruction Sheet, Catalog No. 6700, Copyright 1968 De Luxe Topper Corporation.

*Primary Examiner*—Jay H. Woo
*Assistant Examiner*—Duane S. Smith
*Attorney, Agent, or Firm*—Rosen, Dainow & Jacobs Limited Liability Partnership

[57] ABSTRACT

Toy mold systems usable by a child to form highly detailed, rigid molded toy figures are disclosed. The systems include at least three preformed mold sections each having a configuration such that, in an assembled condition of the toy mold system, they define a mold cavity having at least one undercut. The mold system includes structure for releasably engaging the at least three mold sections in the assembled condition of the toy mold system. In the preferred embodiments, the mold system includes a base, top, and four wall mold sections. One, and preferably all, of the wall sections have a cavity portion with undercuts which provide the detailing on the sides, front and back of the molded toy figure. One of the mold sections functions as a base section into which the other mold section nest and with which they are releasably engaged. Toy mold kits include the toy mold system of the present invention and molding material, which may be a material such as polyvinyl chloride acetate, which produces rigid toy figures, or any conventional plastic molding compound such as plastisol.

19 Claims, 6 Drawing Sheets

TOY MOLD SYSTEM WITH UNDERCUTS

BACKGROUND OF THE INVENTION

The invention disclosed herein relates to toy mold systems usable by children, toy kits including the toy mold systems, and molded toy figures. More particularly, the present invention relates to improved toy mold systems which allow children to make highly detailed molded toy figures. The invention is applicable for use with many types of molding materials which may be introduced into the mold system in solid or liquid form.

Toy mold systems, molding materials or compounds and toy ovens which allow children to make molded toy figures are presently available individually and in kits. For example, Toymax Inc. currently sells such items separately and in kits under its CREEPY CRAWLER® trademark. In general, the kits contain one or more squeeze bottles of plastisol molding material in one or more colors, one or more toy mold systems into which the molding material may be poured, and a toy oven for curing the molding material from a flowable form to a solid form. In the CREEPY CRAWLER® line of toys, the molding material is a liquid plastisol sold under the trademark PLASTI-GOOP® which remains flexible after it solidifies. The molding material, however, may be any plastic-based chemical composition suitable for use by children, such as a thermoplastic or thermoset plastic. Although such mold systems, which have been and are presently commercially successful, enable children to mold a wide range of figures and objects like insects, play jewelry, etc., and provide high play value for children, they are open mold systems typically consisting of only a single open mold section, and therefore are not intended for molding highly detailed figures such as vehicle bodies.

The popularity of toy mold systems was and is based not only on the fun children have in using them to make the molded toy figures but also in the enjoyment children receive from having and playing with the toy figures. However, the toy mold systems and toy mold kits heretofore available, while providing a high play value for children in the molding of toy objects, did not provide nearly as high a play value for the children in playing with the molded toy figures. One reason for this is that children heretofore have not been able to make toy figures with detailing comparable to commercially molded toy figures. The greater the amount of detailing on a molded toy figure, the more interesting and realistic the figure is and the more fun to play with. For example, a molded toy car would be more interesting to play with if it not only had the general contour of a car but also contained some of the more detailed features of a car, such as fenders, headlights, taillights, door handles, license plates, rocker panels, etc.

A prior art toy closed mold system previously sold under the mark "Johnny Toymaker" for forming miniature toy car bodies comprised two mold sections, a top section and a bottom section, which formed a closed mold system. The two mold sections together formed a cavity without undercuts that completely defined the car body. Different sets of mold sections were available for molding toy car bodies. However, because the mold sections lacked undercuts, the toy car bodies molded by this toy correspondingly lacked detail as compared to commercially made miniature toy cars. To provide detail, separate parts such as bumpers which might include grills were glued to the molded parts, which presented certain disadvantages. However, molded car bodies with detailed features adhered thereto may not be as realistic as industrially molded miniature toy cars, because it may be difficult for a child to precisely align the detailed features and to cleanly glue them to the molded car body, especially small detailed features. Further, detailed features adhered to the molded car body may move or separate from the car body over time or with use.

To avoid such problems associated with attaching additional pieces to add detail to a toy figure, it would be preferable to provide children with the capability of creating molded toy figures already containing a desired level of detailing. However, a problem arises in that some detailing in the molded toy figure consists of projections and recesses which are perpendicular to the angle of draw, i.e., the direction in which the mold is opened. These types of projections and recesses in the molded toy figure, often called "undercut sections," can lock onto the corresponding recesses or projections, i.e., the undercuts, in the walls of a mold section when an attempt is made to lift the molded figure from the mold system. Therefore, while it is desirable to provide as simple a toy mold system as possible for use by children, such simple toy mold systems did not have the capability of molding detailed toy objects.

Thus, providing a toy mold system capable of molding detailed toy objects presents a formidable problem in that the objectives of a simple mold system and molding highly detailed figures compete against each other. Any undercuts in a toy mold system make it difficult if not impossible to remove the molded figure from the mold without tearing the undercut sections or bending or distorting the shape of the molded figure, and any toy mold system with undercuts adds to the complexity of the mold system. Therefore, it was generally not feasible to include undercuts in conventional toy mold systems unless the figure was sufficiently flexible so that it could be removed from a mold system having undercuts by flexing the figure. However, the play value of many toy figures, such as miniature cars, is higher if the figure is rigid, as a real car is.

Miniature toy cars can have immense play value when they are replicas of real cars, particularly vintage or popular models, and particularly when a child amasses a collection of the cars. However, because miniature cars having such detail were previously only available as completed units made industrially, collecting them was expensive. Also, any toy mold system which may provide sufficient detail in a molded figure might not be very useful if it could only make one figure. In other words, for the toy mold system to be useful, it should be able to mold a number of different figures, e.g., model cars. To applicants' knowledge, no such toy mold system was heretofore available.

The present invention provides the heretofore missing play value of a toy mold system which can be used to mold toy figures containing greater detail but which is still relatively simple and inexpensive, and easy for children to use, and which may be used to produce toy figures of different shapes and details.

SUMMARY OF THE INVENTION

It is an object of the present invention to provide a toy mold system which produces molded toy figures having greater detail than before, which is of simple construction, and which is easy for children to use.

It is a further object of the present invention to provide a toy mold system which can be used by a child to form molded toy figures having undercut sections.

It is a further object of the present invention to provide a toy mold system which can be used by a child to form rigid, highly detailed molded toy figures such as miniature toy vehicle bodies.

It is another object of the invention to increase the play value of toy mold systems and of the toy figures made therewith.

It is another object of the present invention to provide a toy mold system which achieves any of the above objects and which is capable of molding figures of differing configurations, e.g., different model miniature vehicles.

It is another object of the invention to provide a toy mold system with which a child can mold highly detailed vehicle bodies replicating actual vehicles, and which would enable manufacturers of toy mold systems and kits to take better advantage of licensing vintage and popular vehicle names and models.

Certain of the above and other objects are achieved by a toy mold system comprising at least three preformed mold sections each having a configuration such that, in an assembled condition of the toy mold system, they define a cavity in the shape of a toy figure to be molded in which is defined at least one undercut. The toy mold sections are releasably engaged so that a molded toy figure with an undercut section may be formed, and thereafter the mold system disengaged by a child and the molded toy figure removed from the mold system.

Because the mold system contains more than two sections, the molded figure will have more than one parting line, which is not particularly objectionable given the degree of detail that can be achieved.

In the preferred embodiments, the mold system comprises six mold sections—a base section, a top section and four wall sections. The mold sections are releasably engaged to each other by any suitable means, such as complementary tabs and slots, hinge arrangements using, for example, hooks and pins, other interlocking or mating structure, snap-fitting structure, etc. One or more, and preferably all, of the four wall sections have a cavity portion with indentations and grooves, i.e., undercuts, which provide the highly desirable detailing on the respective sides, front and/or back of the molded toy figure.

In the preferred embodiment, one of the mold sections, e.g., the bottom section, functions as a base section, and the other sections nest with the base section. In this embodiment, the engaging means engages the other sections with the base section.

A tray may be provided having a recess which receives the base section, and used to handle the assembled mold system, for example, when placing it into and when removing it from an oven.

In accordance with the present invention, the toy mold system comprises at least three mold sections which can be releasably engaged or otherwise releasably interconnected to form a toy mold system which in an assembled condition defines a cavity in the shape of the toy figure to be molded. At least two of the sections contain a depression or core, and at least one depression or core extends in a direction which, when the toy mold system is in its assembled condition, is perpendicular to the direction of at least one depression or core of another mold section. As a result, there is at least one undercut in the mold cavity, and at least one undercut section will be formed on the molded toy figure. After the molding material hardens, the toy figure can be removed from the mold system by separating the mold sections. In this way, the undercut in the toy mold system will not hinder or prevent the removal of the molded toy figure from the toy mold system.

Molding material of one or more colors may be employed, and may be any suitable toy plastic molding material, which is relatively rigid when solidified. For example, a liquid molding material which becomes rigid when hardened may be, as presently preferred, a polyvinyl chloride acetate, mixed with a carrier agent to make the molding material flowable, such as an epoxide, and trace amounts of fillers, preservatives and binding agents. The use of a plastic molding material that becomes rigid in a toy mold system to produce toy figures with undercut sections is made possible by the invention, which allows such molded toy figure to be removed from the inventive mold system. A plastisol sold under the trademark PLASTI-GOOP® by Toymax Inc. may also be used, but the object molded therefrom will be flexible, which in certain applications may not be desirable.

The mold material may be solid or liquid when introduced into the mold cavity, and the mold system is constructed accordingly. For example, a fill hole is provided for introducing liquid molding material into the cavity.

The invention also makes possible molding by a child of a number of different, but related toy figures, such as miniature vehicles, which are highly detailed, with the same mold system. The invention achieves this by providing a system for releasably engaging together more than two mold sections selected from a number of mold sections, at least one of which has at least one undercut in a cavity portion thereof. It is also possible according to the invention, to "mix and match" mold sections, so that certain pans of the molded figures could be the same or different from molded figure to molded figure. For example, in the case of molding miniature vehicle bodies, vehicles may be molded having bumpers and grills from one model, and a top, bottom and sides form another model, or the bumpers can be made generic and used with different sets of top, bottom and side sections for different vehicles, etc.

BRIEF DESCRIPTION OF THE DRAWINGS

The invention is illustrated in the figures of the accompanying drawings which are meant to be exemplary and not limiting, in which like references refer to like or corresponding parts, and in which.

DESCRIPTION OF THE PREFERRED EMBODIMENTS

In the molding systems of the preferred embodiments illustrated in the drawings, the toy figures made according to the present invention are multi-sided, three dimensional car bodies 10, containing detailed features on the front 12, back 13 and sides 14. The toy car body 10 may be attached to a chassis and wheels (not shown) to create a toy car. However, the invention is also applicable to other molded toy figures representing other types of vehicles and other objects, such as human characters, animals, monsters, toy jewelry objects, etc. Also, although the invention is described in connection with a molded object such as a car body having contouring on all sides, the invention is applicable to forming figures having contours representing the object on only one side, the other side thereof being flat. Such flat-on-one-side figures may be formed in a simple open mold system which according to the invention has at least two mold sections and one undercut in the mold cavity of the mold system. Further, although the invention is particularly suited for molding rigid objects, such as miniature vehicle bodies, the invention may also be used to mold flexible objects.

Figure 1:
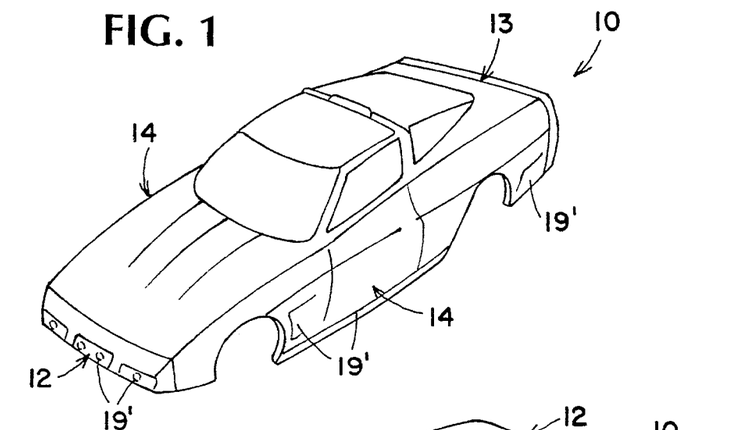
FIG. 1 is a top perspective view of a toy figure in the form of a car body molded in a toy mold system according to the preferred embodiment of the present invention depicted in FIG. 3.
Figure 2:
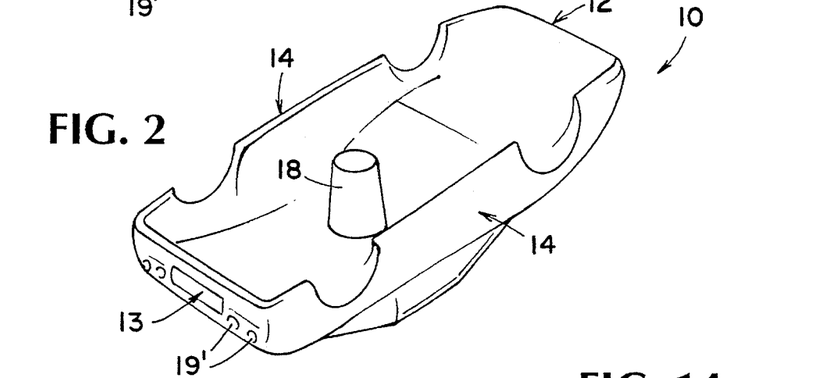
FIG. 2 is a bottom perspective view of the toy figure shown in FIG. 1.
Figures 3, 4:
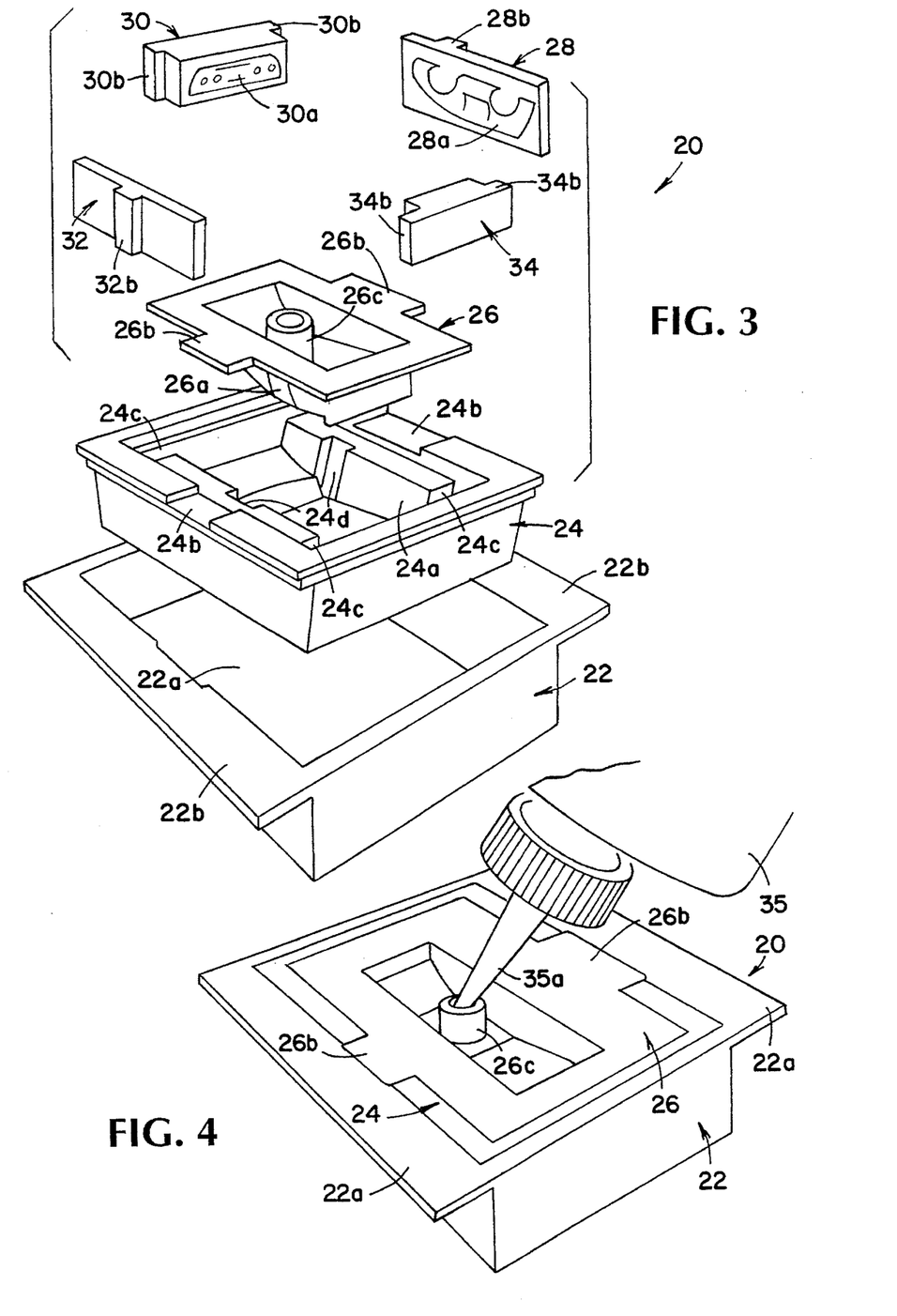
FIG. 3 is an exploded perspective view of the toy mold system according to the preferred embodiment of the present invention.
FIG. 4 is a top perspective view of the toy mold system shown in FIG. 3 in an assembled condition with molding material being introduced therein.
Figure 5:
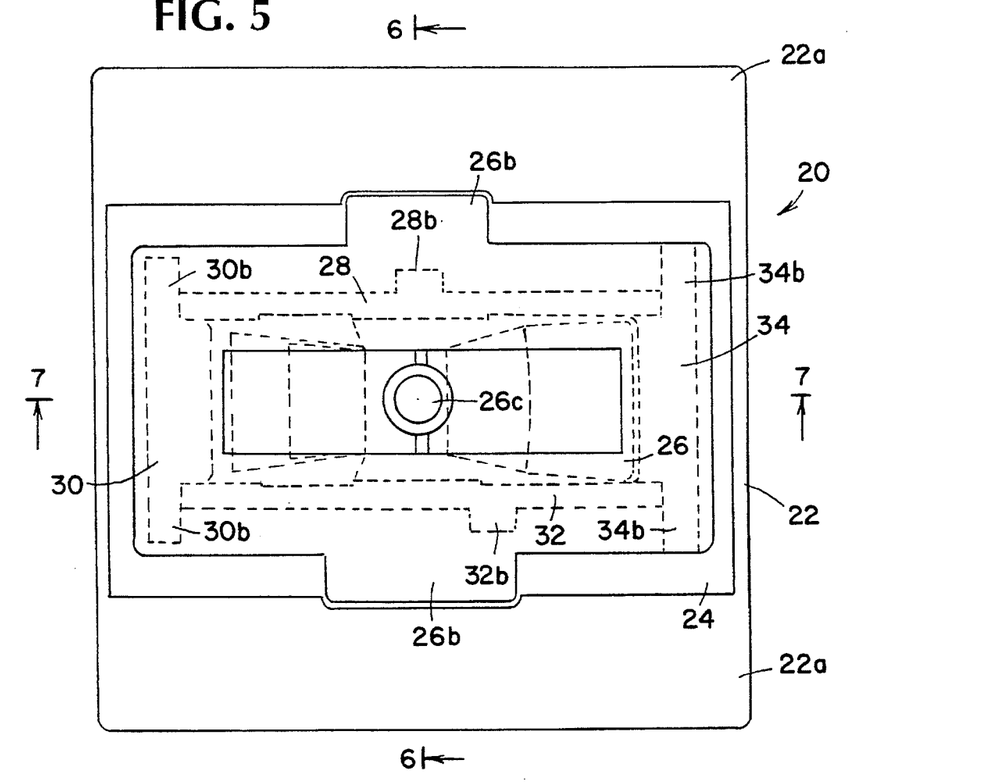
FIG. 5 is a top plan view of the toy mold system shown in FIG. 3.
Figure 6:
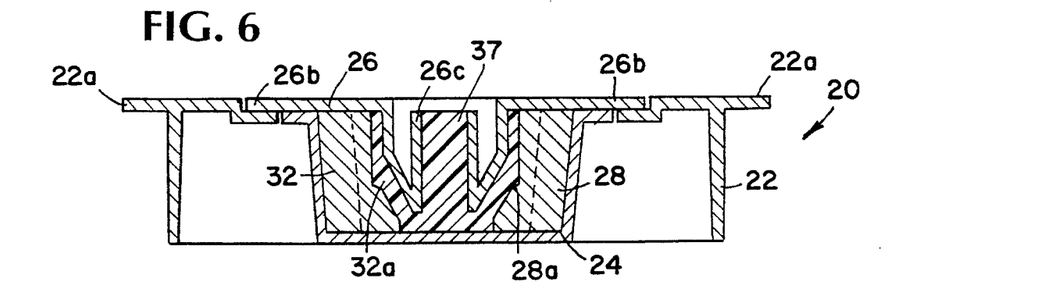
FIG. 6 is a sectional view of the toy mold system shown in FIG. 3 taken along line 6—6 of FIG. 5.
Figure 7:
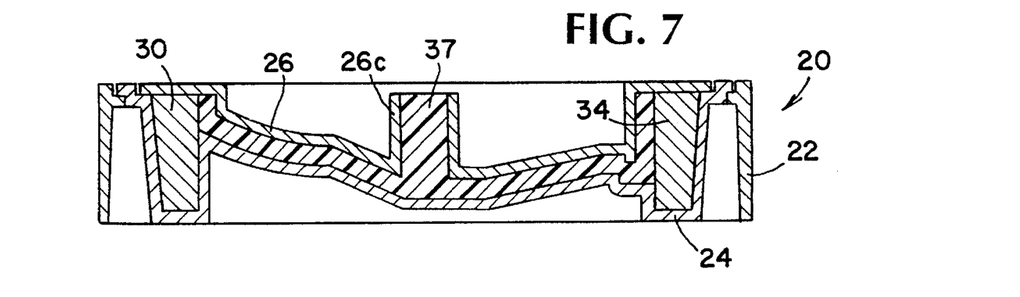
FIG. 7 is a sectional view of the toy mold system shown in FIG. 3 taken along the line 7—7 of FIG. 5.
Figure 8:
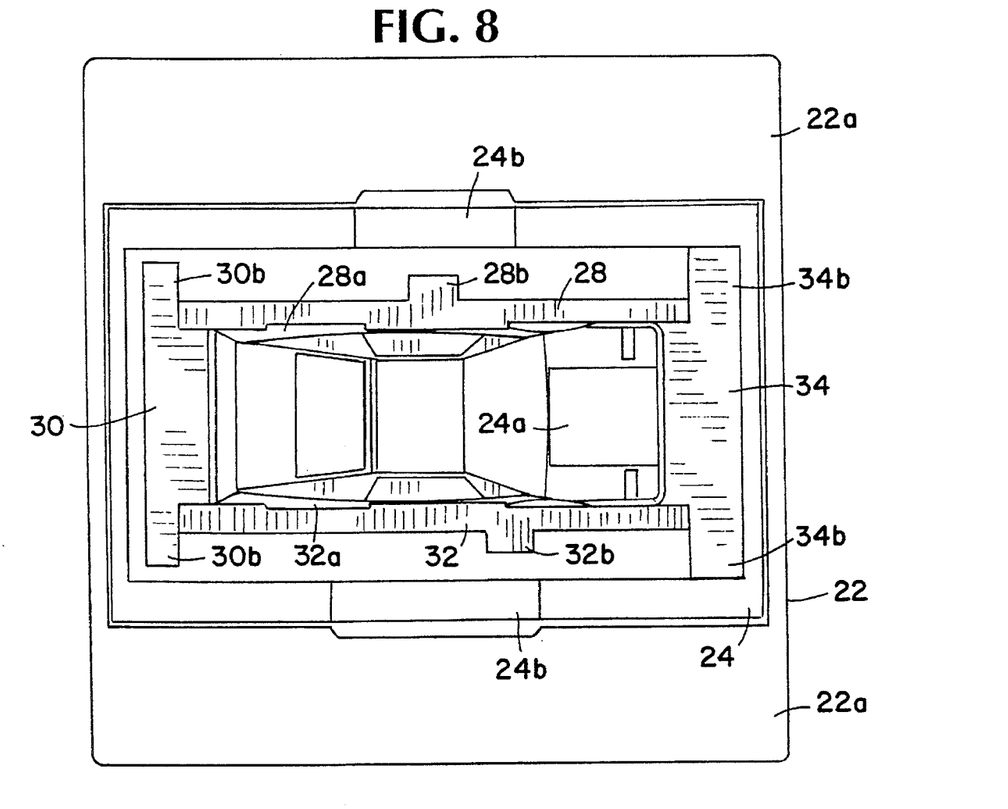
FIG. 8 is a top perspective view of the partially assembled toy mold system shown in FIG. 3 with the top section removed.
Figure 9:
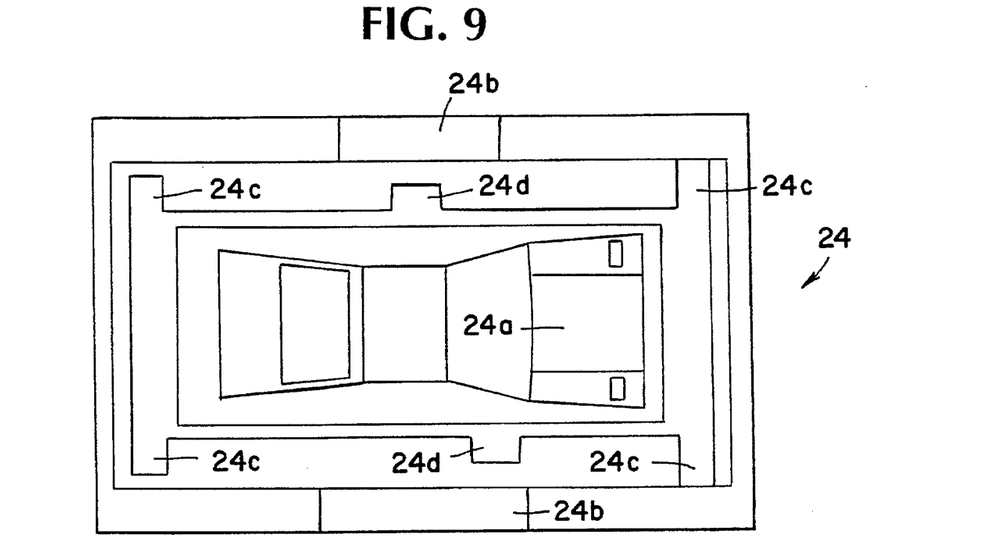
FIG. 9 is top perspective view of the partially assembled toy mold system shown in FIG. 3 with the top and four wall sections removed.
Figure 10:
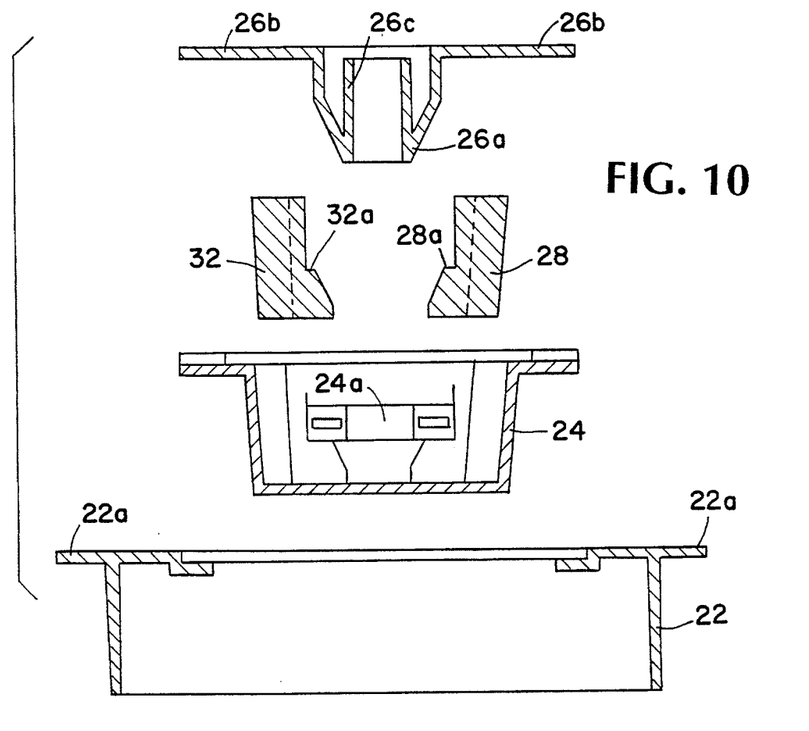
FIG. 10 is a vertical section, exploded view of the toy mold system shown in FIG. 3 taken transversely through the mold system.
Figure 11:
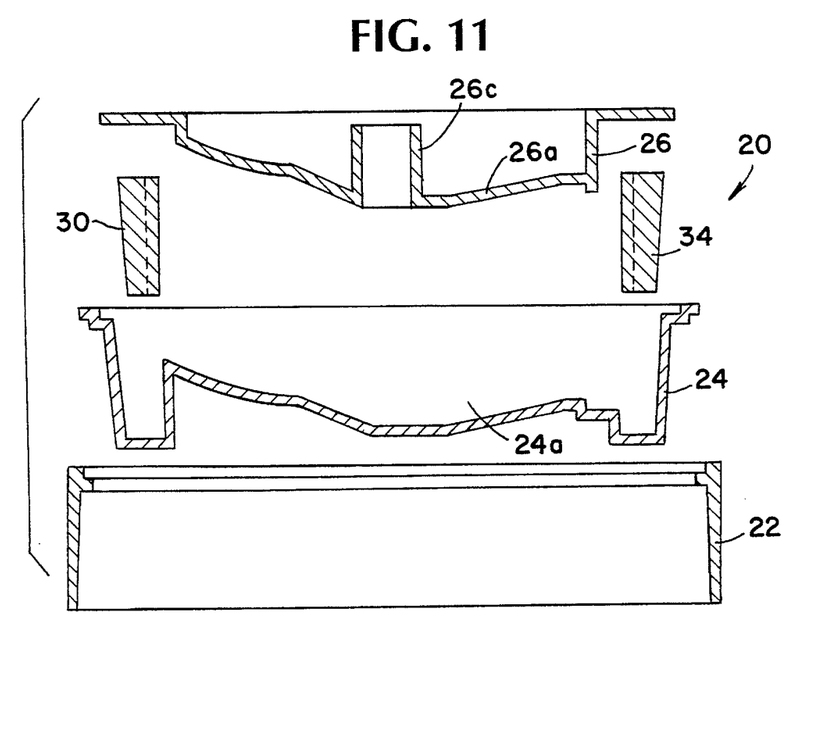
FIG. 11 is a vertical section, exploded view of the toy mold system shown in FIG. 3 taken longitudinally through the mold system.

The toy mold system according to the present invention for forming the toy car body 10 shown in FIG. 1 comprises more than two mold sections, which together define a mold cavity having at least one undercut. In the embodiment shown in the FIGS. 3–15, the toy mold system 20 comprises six mold sections 24, 26, 28, 30, 32 and 34 (see FIG. 3). A base mold section 24, here the bottom section, has a cavity portion 24a which forms the shape of the top of the molded toy car body 10. Top mold section 26 with a core 26a forms the shape of the inside of the molded toy car body 10. The top section 26 has a fill hole 26c through which liquid molding material 37 is introduced when the mold system is in its assembled condition (FIG. 4). An appropriate fill hole may also be used to introduce a solid molding material, or solid molding material can be placed in the cavity in a partially assembled condition of the mold system. As shown in FIG. 4, liquid molding material 37 is stored in a container such as a squeeze bottle 35 having a nozzle 35a, the opening of which is sufficiently narrow to be inserted into the fill hole 26c to permit the introduction or injection of molding material 37 into the mold cavity of the assembled toy mold system 20 without spillage. A projection 18 of the hardened molded material in the inside portion of the car body 10 shown in FIG. 2 results from the fill hole 26c.

Figure 12:
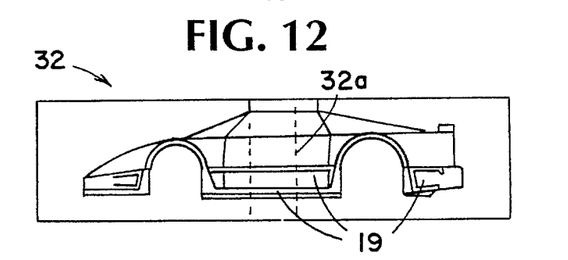
FIG. 12 is an elevation view of the inside of a side wall section of the toy mold system shown in FIG. 3.
Figure 13:
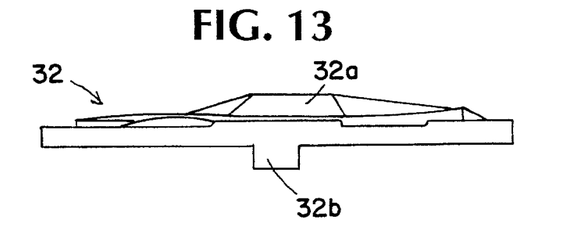
FIG. 13 is a top perspective view of the side wall section shown in FIG. 12.
Figure 14:
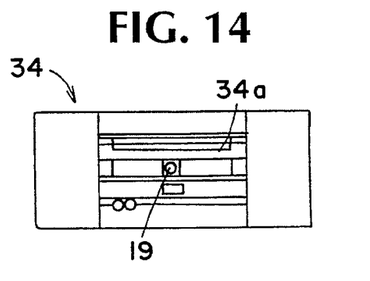
FIG. 14 is an elevation view of the inside of an end wall section of the toy mold system shown in FIG. 3.
Figure 15:
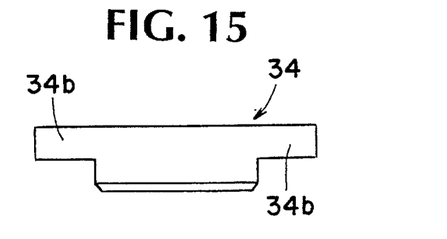
FIG. 15 is a top perspective view of the end wall section shown in FIG. 14.

The remaining mold sections are four wall sections 28, 30, 32, and 34. Side wall sections 28 and 32 have cavity portions 28a and 32a (FIG. 12), respectively, containing indentations and grooves which form detailing on the sides of the molded toy car body 10, such as door handles and lines for doors. Front wall section 30 has a cavity portion 30a containing indentations and grooves which form detailing on the front 12 of the toy car body 10, such as headlights and a license plate. Back wall section 34 has a cavity portion 34a (FIG. 14) containing indentations and grooves which form detailing on the back 13 of the toy car body 10, such as taillights and a license plate. The indentations and grooves in the cavity portions of the four wall sections 28, 30, 32 and 34 are undercuts, e.g. referenced by 19, and form undercut sections, e.g., referenced by 19, on the molded toy car body 10. It is these undercuts in the cavity portions of the mold wall sections which provide much of the detail for the car body 10.

In accordance with the present invention, the various mold sections have a structure which enables the toy mold system to be assembled and held together, and to permit molding material to be introduced without leaking from the mold system. The embodiment shown in FIGS. 3–15 contains a plurality of tabs which can be releasably inserted into and removed from complementary, appropriately sized slots such as by a sliding action. The tabs and complementary slots are sized to provide an interlocking fit between the tabs and slots to engage the mold sections so that molding material 37 does not leak out of the mold cavity of the assembled mold system. The base section 24 has: slots 24b on either side to accept tabs 26b on the top section 26; slots 24c, one in each of the four corners, two of which accept tabs 30b of the front side wall section 30 and two of which accept tabs 34a of the back wall section 34; and slots 24d, offset on either side of the base cavity 24a, one of which accepts tab 28b of one side wall section 28 and one of which accepts tab 32a of the other side section wall 32.

The toy mold system 20 may be assembled by first inserting the wall sections 28, 30, 32, and 34 into the base section 24 in the appropriate locations to align the tabs and slots as described above, and then placing the top section 26 over the base section 24 to align the tabs 26b in the top section with the slots 24b in the base section. A tray 22 is provided for handling the toy mold system 20, for example, for moving it into and out of a toy oven (not shown). Tray 22 has a recess 22a which receives the mold system base section 24, with a lip around the base section 24 being supported by the peripheral edge of the tray. The tray 22 also has ears 22b on either side to fit a mold handler (not shown) used to place the mold system (and tray) in and remove it from a toy oven which heats the molding material in the mold system to harden it. After the molding material has hardened, the mold system 20 is removed from tray 22 and is disassembled by gripping the fill hole 26c and lifting the top section 26 from the base section 24. Because the molding material has hardened, the undercuts in the wall sections 28, 30, 32, and 34 will cause the walls to be lifted out of the base section 24 along with the top section 26. The wall sections 28, 30, 32, and 34 are then each removed by pulling them laterally away from the toy FIG. 10 in the direction of their respective undercuts. The molded toy FIG. 20 is then removed from the top section 26.

The mold sections are made of a metal such as aluminum or zinc or may be made of any other conventional heat resistant material. In its assembled condition, the mold system 20 is approximately 3.5" long by 3.5" wide by 0.75" high, and produces a molded toy car body 10 which is approximately 2.0" long by 0.75" wide by 0.5" high. The dimensions may vary depending on the desired size of the molded toy figure and the size of the particular toy oven intended to be used to change the state of the molding material.

Figure 16:
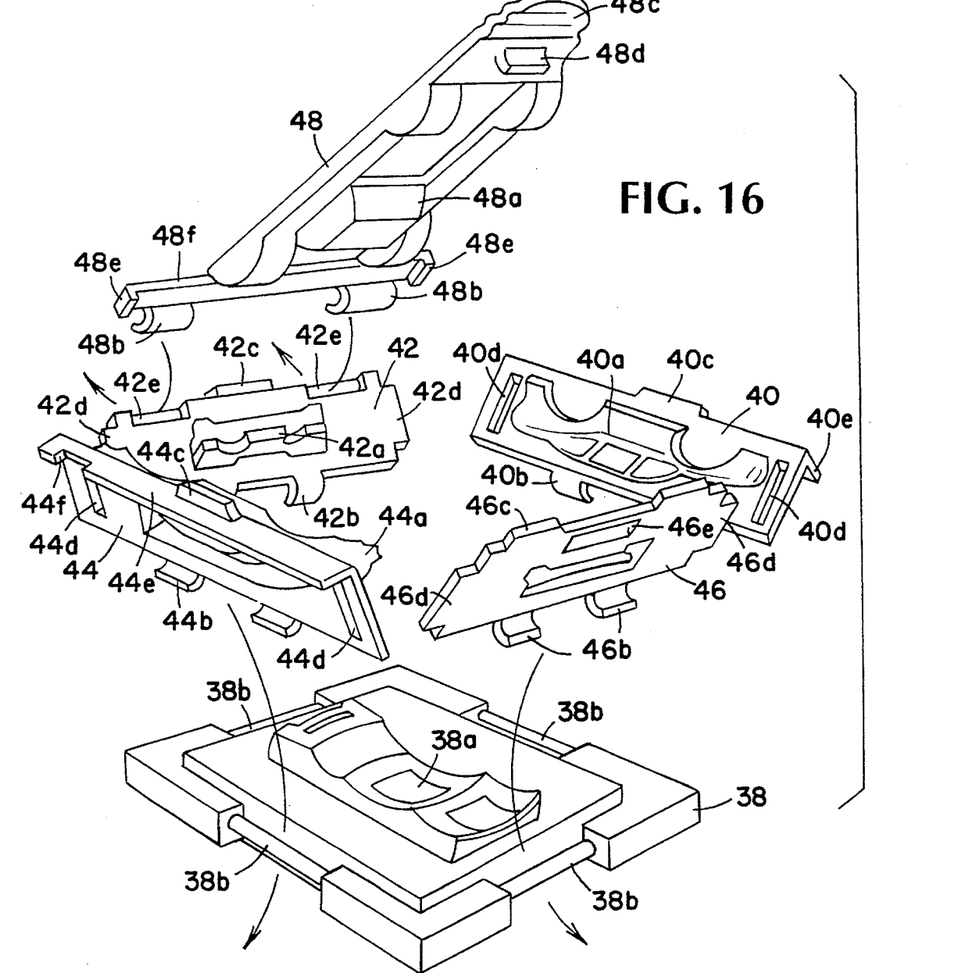
FIG. 16 is an exploded perspective view of a toy mold system according to another embodiment of the present invention.
Figure 17:
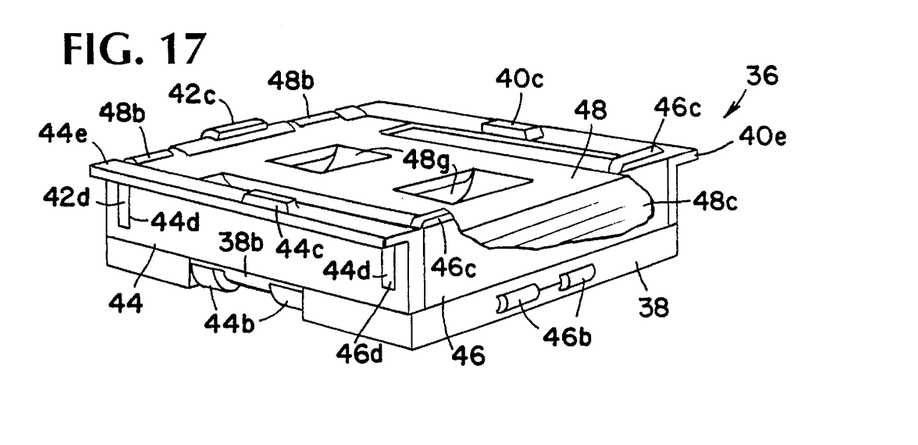
FIG. 17 is a perspective view of the toy mold system shown in FIG. 16 in an assembled condition thereof.

In the embodiment shown in FIGS. 16 and 17, the toy mold system 36 also comprises six mold sections, a base section 38, a top section 48, and four wall sections 40, 42, 44, and 46. The mold system 36 has approximately the same dimensions as the mold system 20 and molds a toy car body of approximately the same size as the one described above. The base section 38 has a cavity portion 38a which forms the shape of the top of the molded toy car body 10. The top section 48 has a core 48a in the shape of the inside of the car body 10, a flap 48c extending beyond the end thereof to assist in lifting the top section when opening the assembled toy mold system, and fill holes 48g for insertion of molding material. Side wall sections 40 and 44 have cavity portions 40a and 44a respectively containing indentations and grooves, i.e., undercuts, which form detailing on the sides 14 of the car body 10, and ears 40e and 44e, respectively, which allow the toy mold system 36 to fit in a tray (not shown) similar to tray 22. Front wall section 42 has a cavity 42a containing undercuts to form detailing on the front 12 of the car body 10. Back wall section 46 has a cavity (not shown) containing undercuts to form detailing on the back 13 of the car body 10. Each of the side wall sections contains at least one raised tab 40c, 42c, 44c, and 46c, which, in an assembled condition of the toy mold system 36, extends upwardly beyond the top section and assists in swinging open the wall sections to remove the molded toy figure.

The toy mold system 36 shown in FIGS. 16 and 17 utilizes cooperating tabs/slots, and crimped hooks/pins which function as hinges to engage the mold sections and maintain them in an assembled condition. The base section 38 has four pins 38b, one on each side, which each releasably accept two crimped hooks 40b, 42b, 44b, and 40b on each wall section. When the hooks are engaged with or hinged to the pins, the wall sections may be rotated (hinged) around the pins so that the wall sections can be opened and closed. The wall sections may also be moved laterally along the pins to permit proper alignment of the side wall sections in relation to the front and back wall sections during assembly of the toy mold system 36.

The front wall section 42 and back wall section 46 each have two tabs 42d and 46d, one on either end of each wall section, which are releasably insertable into complementary slots 40d and 44d on the side wall sections 40 and 44. The top section 48 has two crimped hooks 48b, similar to the ones on the wall sections, coupled to an arm 48f, which are engagable with two pins 42e near the top of the front wall section 42 to hingedly engage the top section 48 to the side wall section 42. To assist in proper positioning of the top section 48 in relation to the side wall sections 40, 44, the top section has two tabs 48e extending downwardly from either end of the arm 48f which fit into a complementary slot 44f on the ear 44e of one side wall section 44 and a complementary slot (not shown) on the ear 40e of the other side wall section 40. The top section 48 also has a catch 48d which is releasably secured into a recess 46e near the top of the back wall section 46 to latch the top section closed over the mold cavity formed by the mold system.

The toy mold system 36 shown in FIGS. 16–17 may be assembled by placing the crimped hooks of each side wall section 40, 44 onto the corresponding pins of the base section 38, inserting the tabs of the front and back wall sections 42, 46 into the corresponding slots of the side wall sections 40, 44 by rotating the wall sections and moving them laterally, placing the crimped hooks of the top section 48 onto the pins of the front wall section 42, and rotating the top section downward towards the base section 38 until the tabs in the top section 48 are inserted into the slots in the ears of the side wall sections 40, 44 and the catch 48d of the top section is latched into the recess 46e of the back wall section 46. After the molding material hardens, the toy mold system 36 may be disassembled by first hinging the top section 48 away from the base section 38 using the flap 48c and rotating the front, back, and side wall sections away from the molded toy figure using the raised tabs. The toy car 10 may be removed simply by disassembling the side wall sections 40, 44.

As indicated above, the particular molding material may be any plastic based material suitable for use with children which changes from a flowable state to a harder state in response to a certain condition or conditions. For example, the molding material may be a thermoplastic, which is solid at room temperature, and is softened by the application of heat to flow in the mold cavity and assume the shape thereof, and then upon removal of the heat, i.e., the mold material returning to room temperature, hardening into the shape of the toy object. The molding material may also be or a thermosetting plastic, which is soft and flowable at room temperature and which hardens when heated. Such molding materials are known to those of skill in the art.

Because, as described above, the toy mold system of the present invention permits the formation of undercut sections in a molded toy figure without the need to bend the figure in order to remove it from the mold, a molding material which produces a more rigid molded figure may be used. The resulting toy figure will be more inflexible then many toy figures made with conventional plastic molding materials such as plastisol, and this is more appropriate for certain applications such as toy car bodies to which a chassis and wheels are attached which might separate more easily if the car body was flexible. Also, a rigid car body would be more realistic than a flexible one. In the preferred embodiments, the molding material is a liquid i.e., is flowable at room temperature, which comprises a polymer with tensile strength and impact resistance such as polyvinyl chloride acetate (commonly known as PVC), a carrier such as epoxidize soybean oil to provide fluidity to the molding material in a proportion of approximately one-third polyvinyl chloride acetate to two-thirds soybean oil, and trace amounts of other chemicals to act as binding agents and preservatives, such as calcium carbonide, titanium dioxide, aluminum hydroxide, and amorphous silicone. As will be evident to those skilled in the art, the types and percentages of the ingredients in the rigid molding material may be varied without substantially changing the rigid quality of the molded toy figure.

Various components described above may be sold separately or as part of a kit. Such kits may include a mold system such as system 20, and one or more squeeze bottles of molding material. The kits may also include a toy oven for heating the molding material to change it from a softer, flowable state to a hardened state. Any conventional packaging may be used to hold and sell all the elements in the toy mold kit, such as a carton or a bubble pack.

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

What is claimed is:

1. A toy mold system comprising at least three preformed mold sections each having a configuration such that, in an assembled condition of the toy mold system, the at least three mold sections define a cavity in the shape of a toy figure to be molded, the mold sections in the assembled condition of the mold system defining at least one undercut in the cavity, and further comprising engaging means for releasably engaging the at least three mold sections in the assembled condition of the toy mold system, whereby a molded toy figure with an undercut section may be formed in the assembled condition of the mold system and removed from the mold system by a child when the mold sections are released from engagement.

2. The toy mold system of claim 1 wherein the at least three mold sections comprise a base section, a top section, and at least one wall section, the at least one wall section being configured to define an undercut.

3. The toy mold system of claim 1 wherein the at least three mold sections comprise four wall sections, at least one of which is configured to define an undercut.

4. The toy mold system of claim 1 further comprising means for introducing molding material into the mold system in the assembled condition thereof.

5. The toy mold system of claim 4 wherein the means for introducing molding material into the toy mold system comprises at least one aperture in at least one of the at least three mold sections which communicates with the cavity of the mold system in the assembled condition thereof.

6. The toy mold system of claim 1 wherein the engaging means comprises complementary slots and tabs associated with respective mold sections such that a tab on one mold section removably slides into a complementary slot in an adjacent mold section, the tabs and slots of adjacent mold sections engaging in the assembled condition of the mold system.

7. The toy mold system of claim 1 wherein the mold sections include a base section sized to receive in nesting fashion the other mold sections, the engaging means engaging the other mold sections with the base section.

8. The toy mold system of claim 7 wherein the engaging means comprises complementary slots and tabs associated with the base section and the other sections such that a tab on either the base section or a respective other section removably slides into a complementary slot in the other section or the base section, respectively.

9. The combination of the mold system of claim 7 and a tray having a recess sized to receive the mold system in its assembled condition.

10. The toy mold system of claim 1 wherein the engaging means comprises complementary hooks and pins associated with respective mold sections such that a hook on one mold section hingedly engages a pin in an adjacent mold section.

11. The mold system of claim 7 wherein the engaging means comprises complementary hooks and pins associated with respective mold sections such that a hook on one mold section hingedly engages a pin in an adjacent mold section.

12. A toy mold system usable by a child for molding a toy figure with at least one undercut section, comprising a base section, a top section and one or more wall sections, the base section being preformed with at least one depression extending downwardly therein in a first direction, and at least one of the wall sections being preformed with at least one depression or indentation such that, in an assembled condition of the toy mold system, the at least one depression or indentation of at least one wall section extends in a second direction perpendicular to the first direction and defines an undercut; and further comprising means for engaging the base, top and wall sections such that a cavity shaped in the form of the toy figure to be molded is formed inside the toy mold system in the assembled condition thereof.

13. The toy mold system of claim 12 wherein the top section has an aperture therethrough which in the assembled condition of the mold system communicates with the cavity and through which molding material may be introduced into the cavity of the toy mold system in the assembled condition thereof.

14. The toy mold system of claim 12 wherein the wall sections comprise four side wall sections each having at least one depression or indentation extending in a direction perpendicular to the first direction, and defining an undercut.

15. The toy mold system of claim 12 wherein the top section has at least one depression extending upwardly into the top section.

16. The toy mold system of claim 12 wherein the top section has at least one indentation extending downwardly away from the top section.

17. The toy mold system of claim 12 wherein the mold sections include a base section sized to receive in nesting fashion the other mold sections, the engaging means engaging the other mold sections with the base section.

18. The toy mold system of claim 17 wherein the engaging means comprises complementary slots and tabs associated with the base section and the other sections such that a tab on either the base section or a respective other section removably slides into a complementary slot in the other section or the base section, respectively.

19. The toy mold system of claim 17 wherein the engaging means comprises complementary hooks and pins associated with respective mold sections such that a hook on one mold section hingedly engages a pin in an adjacent mold section.

* * * * *